United States Patent
Mandaknale et al.

(10) Patent No.: US 9,858,516 B2
(45) Date of Patent: Jan. 2, 2018

(54) SECURE PRINTING

(71) Applicant: Hewlett-Packard Development Company, L.P., Houston, TX (US)

(72) Inventors: Deepak Mandaknale, Bangalore (IN); Sudheer Kari, Bangalore (IN); Rajiesh Komala Narayanan, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 170 days.

(21) Appl. No.: 13/789,607

(22) Filed: Mar. 7, 2013

(65) Prior Publication Data
US 2014/0253943 A1 Sep. 11, 2014

(51) Int. Cl.
*G06K 15/00* (2006.01)
*G06F 3/12* (2006.01)

(52) U.S. Cl.
CPC ....... *G06K 15/4095* (2013.01); *G06F 3/1222* (2013.01); *G06F 3/1238* (2013.01); *G06F 3/1292* (2013.01)

(58) Field of Classification Search
None
See application file for complete search history.

(56) References Cited

U.S. PATENT DOCUMENTS

| | | | |
|---|---|---|---|
| 6,751,732 B2 | 6/2004 | Strobel et al. | |
| 6,922,258 B2 | 7/2005 | Pineau | |
| 7,385,721 B2 | 6/2008 | Shahindoust | |
| 7,526,555 B2 | 4/2009 | Shahindoust | |
| 7,701,602 B2 | 4/2010 | Burke et al. | |
| 7,747,699 B2 | 6/2010 | Prueitt et al. | |
| 7,982,890 B2 | 7/2011 | Corlett et al. | |
| 8,009,311 B2 | 8/2011 | Takahashi | |
| 8,169,633 B2 | 5/2012 | Aikens et al. | |
| 8,610,921 B2 * | 12/2013 | Miyake | 358/1.15 |

(Continued)

FOREIGN PATENT DOCUMENTS

| | | |
|---|---|---|
| JP | 2002-297510 A | 10/2002 |
| WO | WO 2013/095498 | 6/2013 |
| WO | WO-2013/095498 A1 | 6/2013 |

OTHER PUBLICATIONS

"Securing Network Print Jobs," White Paper—Levi, Ray & Shoup, Inc., 2002, pp. 1-9, Available at: <lrs.com/eom/PDF/wp-White-Paper/wb-Securing-Network-english.pdf>.

(Continued)

*Primary Examiner* — John Wallace
(74) *Attorney, Agent, or Firm* — Mannava & Kang, P.C.

(57) ABSTRACT

Systems and methods for securely printing an electronic document. The electronic document is received as a print job at a secure print service system from a user device. The secure print service system generates a job name and a password for the print job by the secure print service system. The secure print service system then transmits the job name for the print job to a network printer communicatively coupled to the secure print service system. At the network printer, a recipient password is received from the network printer. Then, the secure print service system authorizes the printing of the document at the network printer based on comparison of the recipient password received from the network printer and the password generated by the secure print service system.

10 Claims, 4 Drawing Sheets

(56) References Cited

U.S. PATENT DOCUMENTS

| | | | |
|---|---|---|---|
| 2002/0042884 A1 | 4/2002 | Wu et al. | |
| 2003/0115250 A1 | 6/2003 | Bernier et al. | |
| 2003/0187951 A1 | 10/2003 | Shen | |
| 2004/0137928 A1 | 7/2004 | Biundo | |
| 2004/0146327 A1* | 7/2004 | Hata et al. | 400/76 |
| 2005/0057766 A1* | 3/2005 | Delaplace et al. | 358/1.12 |
| 2006/0018445 A1 | 1/2006 | Mittal | |
| 2006/0149970 A1* | 7/2006 | Imazu | 713/183 |
| 2006/0181730 A1 | 8/2006 | Moore | |
| 2007/0050871 A1 | 3/2007 | Mashhour | |
| 2008/0263156 A1 | 10/2008 | Costea et al. | |
| 2008/0320296 A1 | 12/2008 | Walker et al. | |
| 2009/0021776 A1 | 1/2009 | Dolan et al. | |
| 2009/0064346 A1 | 3/2009 | Larsson et al. | |
| 2009/0086246 A1 | 4/2009 | Asai | |
| 2009/0097054 A1* | 4/2009 | Ferlitsch | 358/1.15 |
| 2009/0185223 A1 | 7/2009 | Kanai et al. | |
| 2009/0244595 A1 | 10/2009 | Kim et al. | |
| 2009/0316206 A1* | 12/2009 | Anezaki et al. | 358/1.15 |
| 2010/0027054 A1* | 2/2010 | Reddy et al. | 358/1.15 |
| 2010/0195144 A1* | 8/2010 | Kawai | 358/1.15 |
| 2010/0245033 A1 | 9/2010 | Sasakuma | |
| 2010/0265531 A1 | 10/2010 | Nitta | |
| 2011/0063648 A1 | 3/2011 | Moore | |
| 2011/0255112 A1* | 10/2011 | Martin et al. | 358/1.13 |
| 2012/0246741 A1 | 9/2012 | Klotz et al. | |
| 2012/0262753 A1* | 10/2012 | Viccari et al. | 358/1.15 |
| 2013/0222827 A1 | 8/2013 | Watanabe | |
| 2014/0211233 A1 | 7/2014 | Biswal et al. | |

OTHER PUBLICATIONS

RemoteDocs—Electronic Document Delivery, 2003, pp. 1-3, Data-Vision, Inc., Available at: <remotedocs.com/faqs.htm>.

"Building a Platform to Bridge Low End Mobile Phones and Cloud Computing Services", Tso, F.P. et al., Mar. 2011, pp. 22-26, vol. 9, Issue 1, <http://wwwen.zte.com.cn/endata/magazine/ztecommunications/2011Year/no1/201103/P020110318511856092974.pdf>.

"IVR Ticketing, Interactive Voice Response (IVR) based Payment and Ticketing", Jet Airways, downloaded date Nov. 9, 2011, 2 pages, < http://www.jetairways.com/IT/IT/PlanYourTravel/IVRTicketing.aspx>.

Xiao, H. et al.; "Hierarchical Trustworthy Authentication for Pervasive Computing"; Aug. 6-10, 2007; 3 pages.

Get Started Now—Personal Printing in Use; ThinPrint—Cortado's Printing Technology; http://www.thinprint.com/Products/Overview/PersonalPrinting/Getstarted.aspx, Jan. 8, 2013. pp. 1-2.

Hewlett-Packard Development Company, L.P, "HP Universal Print Driver," Solution and Feature Guide, 2009, <http://h20331.www2.hp.com/Hpsub/downloads/UPD5_guide_final,%20web.pdf>. pp. 1-24.

Hewlett-Packard Development Company, L.P., "HP ePrint Enterprise mobile printing solution," Jul. 2012, <http://www.hp.com/hpinfo/newsroom/press_kits/2012/FallBizPrinting/HP_ePrint_Enterprise_Solution_Brief.pdf >. pp. 1-2.

Hewlett-Packard Development Company, L.P., "HP Universal Print Driver," May 2011, <http://h20331.www2.hp.com/Hpsub/downloads/UPD%205%203%20brief.pdf>. pp. 1-8.

PrinterOn Corporation, "How Does it Work?," Mobile Printing Solutions for Hotels, Libraries, Airports, Cafes; available Mar. 11, 2012, <http://web.archive.org/web/20120311164705/http://www.printeron.com/solutions/cloudsolutions/public/how-does-it-work.html>. pp. 1-1.

Ricoh Americas Corporation, "Ricoh Aficio Common Security Features Guide," 2009, <http://web.archive.org/web/20130123202855/http://www.oit.uci.edu/security/RicohCommonSecurityFeaturesGuide.pdf>. pp. 1-27.

RICOH, "Print Cloud," User's Guide, 2011, <http://www.ricoh-cloud.com/files/PrintCloud_UserGuide_1.7.pdf>. pp. 1-63.

Hewlett-Packard Development Company, L.P., "Cloud printing in the enterprise: Liberating the mobile print experience from cables, operating systems and physical boundaries," Mar. 2010, <http://www.hubtechnical.com/Collateral/Documents/English-US/HP/11-CloudPrintingintheEnterprise.pdf>.

Hewlett-Packard Development Company, L.P., "HP Access Control Secure Pull Printing," Nov. 2008, <http://h71028.www7.hp.com/enterprise/downloads/HP-Access-Control-Secure-Pull-Printing.pdf>.

Hewlett-Packard Development Company, L.P., "HP ePrint Enterprise mobile printing solution," Mar. 2010, <http://www.hp.com/hpinfo/newsroom/press_kits/2010/MPSSpring2010/pdf/HP_ePrint.pdf>.

Hewlett-Packard Development Company, L.P., "HP ePrint Enterprise mobile printing solution," Sep. 2010, <http://www.hp.com/hpinfo/newsroom/press_kits/2010/InnovationSummit/HP_ePrint_Enterprise_Solution.pdf>.

International Preliminary Report on Patentability received in PCT Application No. PCT/US2011/066792, dated Jun. 24, 2014, 7 pages.

* cited by examiner

SECURE PRINTING

BACKGROUND

Printing devices are used to print hard copies, of electronic documents stored on user devices, for personal, business, or administrative purposes. Examples of user devices may include workstations, personal computers, personal digital assistants (PDAs), laptop computers, notebooks, smart phones, and the like. The printing devices can directly communicate with user devices, or can communicate with the user devices over a network.

In case the printing devices communicate with the user devices over a network, network printers are generally employed. The network printers have built-in network interfaces, such as wireless or Ethernet interfaces, and can work with any user device connected to the network. Further, in many establishments, the network printers are shared by multiple user devices for optimal use of printer resources.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

Figure 1:
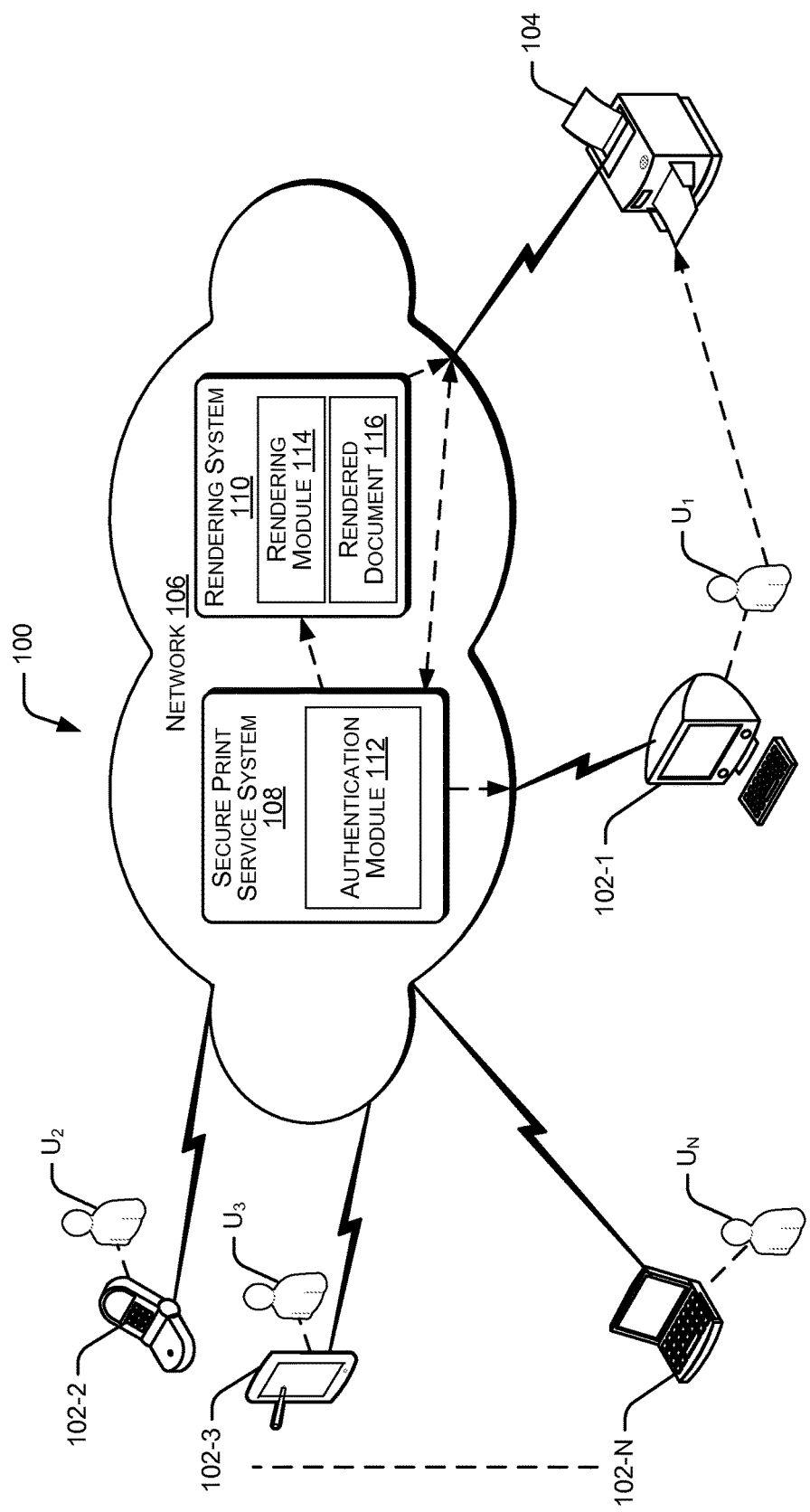
FIG. 1 illustrates a network printing environment for secure printing, in accordance with principles of the present subject matter.

In network printing, network printers and user devices, such as workstations, personal computers, personal digital assistants (PDAs), laptop computers, notebooks, smart phones, and the like, typically communicate with each other over a wired or wireless network. The network printers may also support directly connected user devices. Further, the network printers are often shared by multiple user devices for optimal usage.

Generally, a user can submit a print job to a network printer from any of the user devices connected to the network. The print job can be submitted either by using a printer driver or by using a driverless web-based platform. The printer driver is normally associated with only one network printer; however, the web-based platform is normally associated with all the network printers connected to the network. For example, the web-based platform can assign an email address to each network printer connected to the network. A user of a user device connected to the network can print an electronic document using a network printer by sending an email to the email address of the network printer. At the network printer, all the documents sent to the email address assigned to the network printer are printed. However, when the web-based platform is used, hard copies printed at the network printers can be accessed, removed or read by any person before an intended recipient can retrieve the hard copies. This can lead to confidential or sensitive information becoming known to unauthorized persons.

Various method(s) and system(s) of the present subject matter described herein allow a user for securely printing an electronic document by submitting a print job through a user device connected to a network. In one implementation, the user device may access a web portal for using printing services. The web portal may be accessed, for example, by executing a web application or by accessing a uniform resource location (URL) address through a web browser. The web portal may present a user interface, such as a print dialogue box or a graphical user interface (GUI), which allows the user to provide the document to be printed and various print options, such as an address of a network printer on which the electronic document has to be printed. Further, for secure printing, the print options can include an electronic address of an intended recipient who is authorized to take the printed document. The electronic address can include any of an email address, a phone number, and the like. Additionally, the user may include, in the print option, an electronic message, such as an email or a short service message (SMS), for the intended recipient.

Upon submission of the print options, the print job is transmitted to a secure print service system. The secure print service system generates a job name and a password for the print job, and then sends the job name and the password to the electronic address of the intended recipient via an authentication message. In an example, the secure print service system transmits the job name to the network printer selected by the user. In order to obtain the printed document, the intended recipient can enter, as a recipient password, the password received via the authentication message on a printer panel of the network printer. The recipient password may be understood as a password provided by the intended recipient to the network printer.

In one implementation, the recipient password for the print job is communicated by the network printer to the secure print service system. The secure printing service system then authenticates the printing of the documents at the network printer based on a comparison of the recipient password received from the network printer and the password generated by the secure print service system.

In this way, access to hard copies or print outs of any electronic document from the network printer can be controlled so that the intended recipient alone receives the print outs of the electronic document. Thus, the network printing can be made secure and chances of confidential information being shared with unauthorized persons can be reduced considerably.

Methods and systems of the present subject matter are further described in conjunction with FIGS. 1 to 4. It should be noted that the description and figures merely illustrate the principles of the present subject matter. Further, one can devise various arrangements that, although not explicitly described or shown herein, embody the principles of the present subject matter and are included within its spirit and scope. Furthermore, all examples recited herein are intended to be for pedagogical purposes to aid the reader in understanding the principles of the present subject matter.

FIG. 1 illustrates, as an example, a network printing environment 100 for secure printing of electronic documents, according to principles of the present subject matter. The network printing environment 100 includes a plurality of user devices 102-1, 102-2, 102-3 . . . , 102-N, hereinafter collectively referred to as user devices 102 and individually as user device 102. Examples of the user devices 102 may include, but are not limited to, workstations, personal computers, personal digital assistants (PDAs), laptop computers, notebooks, smart phones, smart cameras, smart television sets, and other smart devices.

Further, the network printing environment 100 can include a plurality of network printers out of which one network printer 104 is shown for the sake of simplicity. In an example, the network printer 104 and the user devices 102 are connected over a network 106 via wired, wireless, optical, or other types of network connections. The network 106 may be a single network or a combination of multiple networks. The network 106 may include one or more area networks, such as a local area network (LAN), a wide area network (WAN), an intranet, the internet, or any other type of network. In an example, the network 106 may include mobile communication network, for example, 2G, 3G or 4G mobile communication network.

In an example, the network 106 can correspond to a cloud network. Generally, the cloud network is a computer network accessible over the internet and/or web, and is dynamically scalable with virtualized resources, such as printing resources. The cloud network can be used to provide cloud printing services through web portals that are accessible from web browsers, while application programs for printing are made available by the cloud printing services. The cloud printing services are usually provided by print servers (not shown in figures) in the cloud network. For example, a print server present in the cloud network can support the infrastructure, the platform, and the application programs for the cloud printing services.

In an example, the network printer 104 may be a cloud printer. The network printer 104 can be registered with a cloud printing service using any of the user devices 102 or using the network printer 104 itself. The cloud printing service usually maintains a list of registered network printers, so that a user can find and enter an address of a network printer from amongst the registered network printers for printing an electronic document. The address of the network printer may include email address, internet protocol (IP) address, or other electronic address associated with the network printer.

In an example, a user $U_2$, out of a plurality of users $U_1$, $U_2, U_3 \ldots, U_N$ of the user devices 102, can login to the cloud printing service. The user $U_2$ can login from the user device 102-2 present anywhere in the network 106, for submission of a print job to the network printer 104. Further, for submission of the print job, the user device 102-2 can facilitate the user $U_2$ to access a web portal of the cloud printing service. In an example, the user $U_2$ may access the web portal by selecting a print command for printing an electronic document. In another example, the user $U_2$ may access the web portal by directly entering a URL address of the web portal in a web browser. In yet another example, the user $U_2$ may access the web portal using other web elements, such as widgets, and web enabled applications.

Further, the web portal may present a user interface, such as a print dialogue box, or a graphical user interface (GUI). The user interface allows the user $U_2$ to provide various print options, such as an address of a network printer on which the electronic document has to be printed. Further, for secure printing, the print options can include an electronic address of an intended recipient who is authorized to take the printed document. Additionally, the user may include, in the print option, an electronic message, such as an email or a short service message (SMS), and may include an electronic document to be printed on the network printer. After the user $U_2$ provides the print options at the web portal, a print job is transmitted from the web portal to the cloud printing service. In an example, the cloud printing service may include a secure print service system 108 and a rendering system 110.

At the cloud printing service, the web portal for printing is managed by the secure print service system 108. In an example, the secure print service system 108 may be a print server, a web server, or a data server. The secure print service system 108 includes an authentication module 112. The authentication module 112 receives the print job submitted through the user device 102-2. The print job includes at least one of an address of the network printer 104, an electronic address of the intended recipient, a document for printing, and an electronic message for the intended recipient.

In one implementation, the authentication module 112 generates a pair of a job name and a password for the received print job. In an example, the job name may be referred to as a name of the print job. The job name may be descriptive and may contain the name of the electronic document to be printed. For example, a job name "Sec_Print" may refer to a print job associated with the printing of an electronic document having title "Secure Printing". Thus, the job name may allow an intended recipient to identify the print job associated with the job name on the network printer 104.

Further, for securely printing the print job, the job name for the print job is paired with the password. The password, in general, may refer to any word or phrase, including artificial compound words, combination of numbers, symbols, etc., that is used for authentication of a user to prove identity.

In an example, the authentication module 112 generates the password for the print job based on predefined password generation rules. The predefined password generation rules may require minimum and/or maximum lengths of alphanumeric characters positioned in a specific order. For example, the password generation rules may require 6 to 24 alphanumeric characters in length, where first and last characters are alphabetic and at least one intervening character is numeric. Further, the password generated by the authentication module 112 may be valid for a predefined time period, say, 15 days.

Further, the authentication module 112, in an example, may ensure that the password may expire after a single use, to minimize the security risk of unauthorized interception of the printed document.

In another implementation, the user may provide the job name and the password as a part of the print job. The authentication module 112 may then save the job name and the password in association with the document to be printed.

Once the job name and the password are generated or received, the authentication module 112 of the secure print service system 108 transmits the job name associated with the print job to the network printer 104.

Further, the secure print service system 108, in an example, may act as a messaging client server and transmit the pair of job name and the password for the print job through an authentication message, such as an email or a short service message (SMS), to the electronic address of the intended recipient, say, the user $U_1$. The electronic address of the intended recipient is provided by the user $U_2$ as one of the print options while submitting the print job at the web portal.

In an example, the secure print service system 108 transmits the electronic document associated with the print job to the rendering system 110, such as a cloud printing group (CPG).

The rendering system 110 includes a rendering module 114 to render and/or format the electronic document before sending it to the network printer 104. The rendering of the electronic document may include conversion of the format of the electronic document into a format compatible with the selected network printer 104. The electronic document with converted format is then stored as a rendered document 116 in the rendering system 110.

The rendered document 116 is provided to the network printer 104 for being printed, in case a recipient password provided by the intended recipient, say, the user $U_1$, at the network printer 104 is authenticated by the secure print service system 108.

In one implementation, for the authentication, the secure print service system 108 can determine whether the recipient password received for a job name matches with the password that was generated for that job name and sent to the intended recipient through the authentication message, as is explained in detail later with reference to FIG. 2.

In an example, the intended recipient can be the user itself and the intended recipient's user device that receives the job name and the password for the print job can be the user device that has been used for submission of the print job. For example, in case the user $U_1$ wants to print documents containing personal or confidential data, such as mails and photos, the user $U_1$ can send the job name and the password on his own electronic address so that no one other than him can collect print outs of the documents sent for printing.

In this way, access to print outs of an electronic document printed from the network printer can be controlled so that an intended recipient alone receives the print outs of the document. For example, in case the network printer is provided in an enterprise that deals with confidential information, such as law firms, financial firms, banks, and the like, client related electronic documents may be securely printed according to the present subject matter. Thereby, the client related electronic document may be protected from being shared with unauthorized persons. Thus, network printing can be made secure and chances of confidential information being shared with unauthorized persons can be reduced considerably.

In another example, a user can send a print job from a remote location and may select themselves as the intended recipient. In this example, the user can take print outs of the print job at a later time, when the user is at the site of the network printer, by providing the password received from the secure print service system 108.

In another example, in case of business operations where data is transferred through fax, data security is limited as hard copies received at fax machines can be removed or read by any person before an intended recipient can retrieve the hard copies. In such cases, instead of sending a fax, secure printing can be used as per the present subject matter to protect the communication data from unauthorized access. In such a case, the address of the intended recipient may include the fax number.

In yet another example, in cases where confidential documents are transferred via courier or postal services, the courier and postal services are normally costly, un-trustable and time consuming. In such cases, secure printing as per the present subject matter can facilitate instant transfer of the confidential documents from one party to another in a secure way.

Further, in an example, the working of the secure print service system 108 implemented in the network printing environment 100, is described in more detail with reference to FIG. 2.

Figure 2:
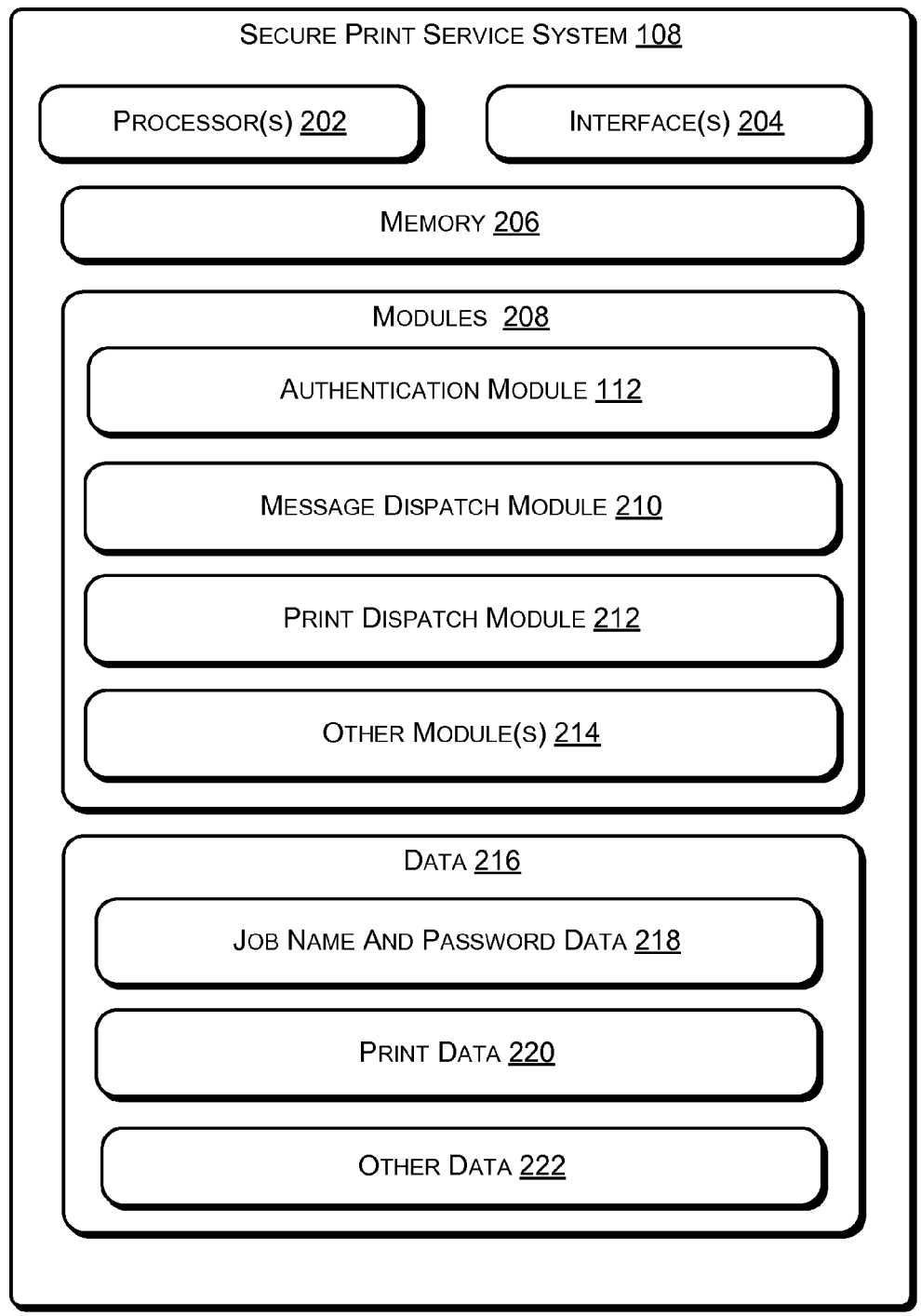
FIG. 2 illustrates an example secure print service system, in accordance with principles of the present subject matter.

FIG. 2 illustrates, as an example, the secure print service system 108, in accordance with principles of the present subject matter. The secure print service system 108 includes processor(s) 202, interface(s) 204, and a memory 206. The processor 202 may be implemented as one or more microprocessors, microcomputers, microcontrollers, digital signal processors, central processing units, state machines, logic circuitries, and/or any devices that manipulate signals based on operational instructions. The processor 202 is coupled to the memory 206. Among other capabilities, the processor 202 is provided to fetch and execute computer-readable instructions and/or applications stored in the memory 206.

The interface(s) 204 may include a variety of application programs and hardware interfaces, for example, a network interface allowing the secure print service system 108 to interact with the user devices or the network printers. Further, the interface(s) 204 may enable the secure print service system 108 to communicate with other computing devices, such as web servers and external repositories or databases. The interface(s) 204 can also facilitate multiple communications within a wide variety of networks and protocol types, including wired networks, for example, LAN, cable, etc., and wireless networks, such as WLAN, cellular, or satellite.

The memory 206 can include any non-transitory computer-readable medium known in the art including volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one implementation, the secure print service system 108 may include module(s) 208. The module(s) 208 may be coupled to the processor(s) 202 and amongst other things, may include routines, programs, objects, components, data structures, etc., which perform particular tasks or implement particular abstract data types. In another implementation, some or all of the module(s) 208 may be present on a non-transitory computer readable medium that is internal or external to the secure print service system 108. In such an implementation, a processing resource, such as the processor 202 or a processor of any other computing device, may access the modules from the non-transitory computer readable medium, and may fetch and execute instructions corresponding to the modules.

The module(s) 208 includes the authentication module 112, a message dispatch module 210, a print dispatch module 212, and other module(s) 214. The other module(s) 214 may include programs or coded instructions that supplement applications and functions of the secure print service system 108. It will be appreciated that such modules may be represented as a single module or as a combination of different modules.

In one implementation, the secure print service system 108 may include data 216. The data 216 serves, amongst other things, as a repository for storing data processed, received and generated by one or more of the modules 208. The data 216 includes, for example, job name and password data 218, print data 220, and other data 222. In one implementation, the job name and password data 218, the print data 220, and other data 222 may be stored in the memory 206, for example, in the form of data structures.

In operation, a user, for example, the user $U_2$ can access a web portal of the cloud printing service through the user device 102-2 for submission of a print job. In an example, the web portal can be accessed by selecting a print command for printing an electronic document. The print command may access a web application and display the web portal. In another example, the web portal can be accessed directly by entering a URL address of the web portal in a web browser. In yet another example, the web portal may be accessed using other web elements, such as widgets and web enabled applications.

Figure 3:
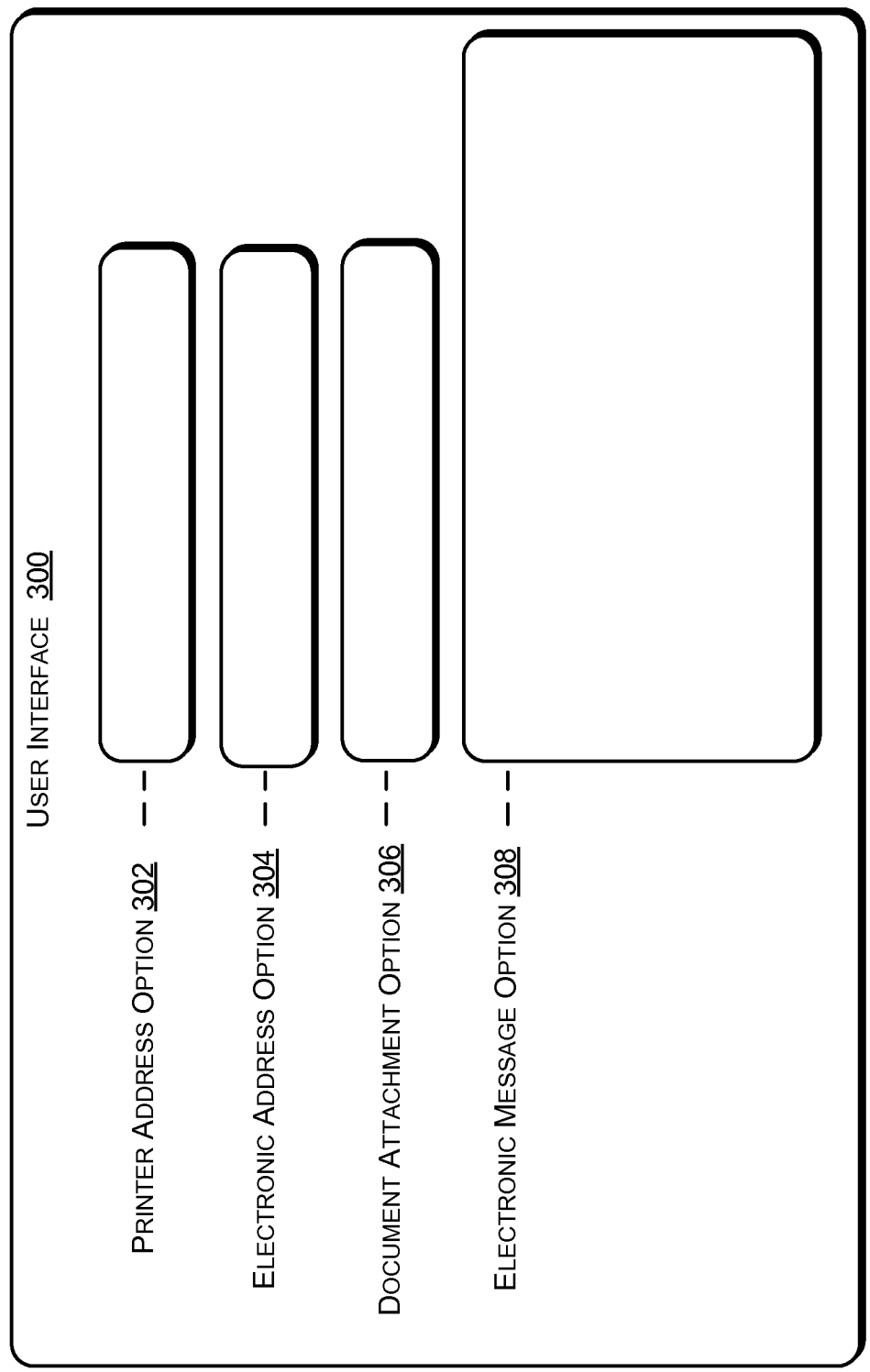
FIG. 3 illustrates a user interface for sending a secure print job, in accordance with principles of the present subject matter.

Further, the web portal may present a user interface 300, such as a print dialogue box or a graphical user interface (GUI), as shown in FIG. 3. The user interface 300 includes various print options, for example, a printer address option 302 for providing address of a network printer to select a network printer out of the network printers registered with the cloud printing service, an electronic address option 304 for providing an email address or a phone number of an intended recipient, a document attachment option 306 for uploading an electronic document to be printed, and an electronic message option 308 for writing emails or short service messages for an intended recipient.

The print options provided by the user $U_2$ are transmitted as a print job to the secure print service system 108 of the cloud printing service. At the secure print service system 108, the print job is received by the authentication module 112. The authentication module 112 is provided to generate a pair of a job name and a password for the print job, and stores the pair of the job name and the password, as the job name and password data 218. Further, the authentication module 112 associates the pair of the job name and the password with the electronic document to be printed, and stores the electronic document as the print data 220.

The authentication module 112 provides the pair of the job name and the password to the message dispatch module 210. The message dispatch module 210 then dispatches an authentication message containing the pair of job name and the password generated for the received print job to an intended recipient. The intended recipient, say, the user $U_1$, can receive the authentication message through an authentication message, such as an email or a SMS.

Further, the authentication module 112 provides the electronic document associated with the print job to the print dispatch module 212. The print dispatch module 212 transmits the electronic document to the rendering module 114 of the rendering system 110. The rendering module 114 can then render and/or format the electronic document, and stores it as the rendered document 116. In an example, the rendered document may be an electronic document that is converted into a format compatible with the selected network printer 104.

In an example, the authentication module 112 transmits the job name associated with the print job to the network printer 104, for displaying the job name at a printer panel of the network printer 104. The message displayed on the printer panel may provide a blank field to enter a recipient password associated with the job name displayed by the printer panel. In an example, the printer panel may use any mechanism that facilitates exchange of information between the network printer 104 and a user. Examples of the printer panel may include, but are not limited to, a control panel with a display and a keypad, a liquid crystal display (LCD), a touchpad, or any combination thereof.

The intended user, say, the user $U_1$, can then enter the password, received from the message dispatch module 210 in the authentication message, as the recipient password in the printer panel of the network printer 104 in response to the job name being displayed on the printer panel. In one example, the user $U_1$ can select the job name from a list of pending job names displayed on the printer panel and can provide the recipient password for the selected job name.

In one implementation, the pair of the recipient password provided by the user $U_1$ and the job name displayed on the printer panel are transmitted from the network printer 104 to the authentication module 112 of the secure print service system 108. The authentication module 112, then determines whether the pair of the job name and recipient password, received from the network printer 104, matches with any pair of job name and password stored in the secure print service system 108. In case the pair of the job name and the recipient password received from the network printer 104 does not match with any pair of job name and password stored in the secure print service system 108, then the recipient, say, user $U_1$, is not authenticated by the authentication module 112 for obtaining the prints. In such a case, the secure print service system 108 may transmit instructions to the network printer 104 for receiving again the recipient password from the intended recipient, say, the user $U_1$, or for blocking the print job.

On the other hand, in case the pair of the job name and the recipient password received from the network printer 104 matches with a pair of job name and password stored in the secure print service system 108, then the recipient password entered by the intended recipient, say, the user $U_1$, is authenticated by the authentication module 112. In such a case, the print dispatch module 212 notifies the rendering system 110 to dispatch the rendered document 116 to the network printer 104.

In this way, once the recipient password is authenticated, the print dispatch module 212 may direct the rendering system 110 for sending the rendered document 116 to the network printer 104. This may reduce the time required for rendering the electronic document after the recipient password is authenticated.

Thus, the aforesaid secure printing approach, described in accordance with present subject matter, provides the secure print service system 108 that can generate a password for a print job related to an electronic document to be printed, associate the password with the print job, and securely communicate the password to an intended recipient by an electronic message. The electronic document can also be rendered by a rendering system and kept ready for printing. Once the recipient enters the password as a recipient password on the printer panel of the network printer 104, the recipient password is communicated to the secure print service system 108, and upon validation, the rendered electronic document to be printed can be communicated to the network printer 104 for being printed.

Figure 4:
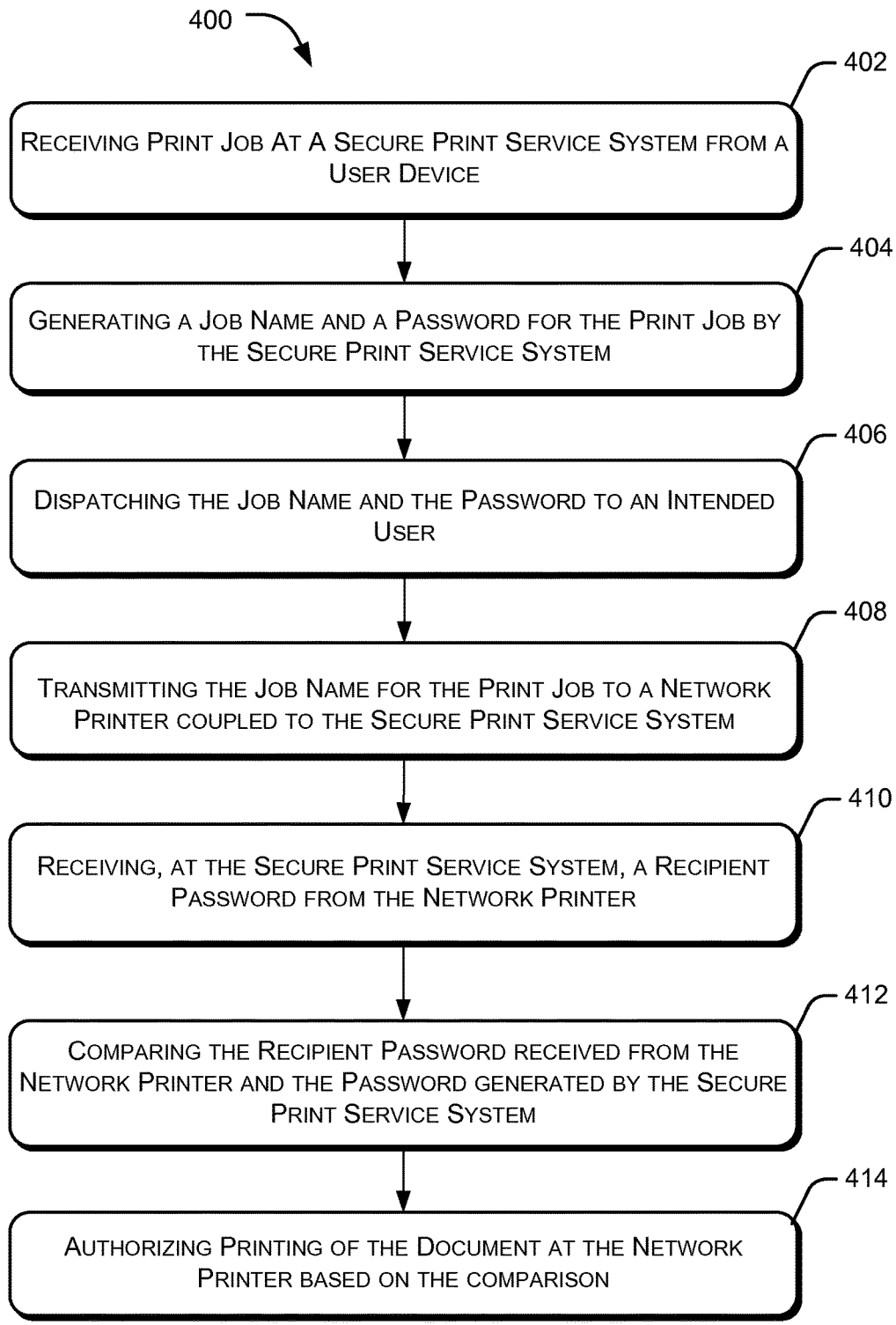
FIG. 4 illustrates a method for secure printing of an electronic document, in accordance with principles of the present subject matter.

FIG. 4 illustrates a method 400 for secure printing of an electronic document, in accordance with principles of the present subject matter. The order in which the method 400 is described is not intended to be construed as a limitation, and any number of the described method blocks can be combined in any order to implement the method 400, or an alternative method. Additionally, individual blocks may be deleted from the method 400 without departing from the spirit and scope of the subject matter described herein. Furthermore, the method 400 can be implemented in any suitable hardware, software, firmware, or combination thereof.

Further, although the method 400 for secure printing may be implemented in a variety of printing systems working in different network printing environments, in embodiments described in FIG. 4, the method 400 is explained in context of the aforementioned network printing environment 100, for the ease of explanation.

Referring to FIG. 4, in an example, at block 402, the method 400 may include receiving a print job at an authentication module 112 of the secure print service system 108. The print job is received from at least one user device, for example, a user device 102-2 associated with a user $U_2$. The user device 102-2 includes a web application (not shown in figures) that facilitates an access of a web portal of the cloud printing service. The web application has a user interface 300 (shown in FIG. 3), such as a print dialogue box or a graphical user interface (GUI), that allows the user $U_2$ to select various print options, such as uploading the document to be printed, providing an address of a network printer to select a network printer from the registered network printers, providing a recipient's electronic address, providing an electronic message, etc.

At block 404, the method 400 may include generating a job name and a password for the print job by the secure print service system 108. The job name and the password are then stored in the secure print service system 108.

At block 406, the method 400 may include dispatching an electronic message including the pair of job name and the password to an intended recipient so that the intended recipient, say, $User_1$, can receive the authentication message having the pair of the job name and the password.

At block 408, the method 400 may include transmitting the job name from the secure print service system 108 to a network printer 104.

At block 410, the method 400 may include obtaining, at the secure print service system 108, a recipient password provided from the network printer 104. Upon receipt of the job name and the password, the intended recipient, say, the user $U_1$, may provide the recipient password at the network printer 104 to retrieve the print outs of the electronic document associated with the print job.

At block 412, the method 400 may include comparison of the recipient password received from the network printer 104 and the password generated by the secure print service system 108.

At block 414, the method 400 may include authorizing the printing of the documents at the network printer 104, based on the comparison of the recipient password received from the network printer 104 and the password generated by the secure print service system 108. Once the password is authenticated, the secure print service system 108 may direct the rendering system 110 for transmitting the electronic document to the network printer 104, for being printed.

In this way, a user can print an electronic document confidentially at the network printer that is not owned by the user. Further, from a remote location, a user can print an electronic document confidentially on a network printer that is owned by the user. Thus, according to the present subject matter, the network printing can be made secure and chances of confidential information being shared with unauthorized persons can be reduced considerably The methods described herein can be implemented by computer readable instructions stored in one or more non-transitory computer-readable media, for example, computer storage media or other tangible media.

Although implementations for the secure print service system have been described in language specific to structural features and/or methods, it is to be understood that the appended claims are not necessarily limited to the specific features or methods described. Rather, the specific features and methods are disclosed as exemplary implementations for secure printing systems.

We claim:

1. A method for securely printing a document, the method comprising:

receiving a print job at a secure print service system from a user device, the print job including the document to be printed;

generating a job name and a job password for the print job by the secure print service system;

transmitting an electronic message comprising the job name and the job password to an intended recipient, the electronic message excluding the document;

transmitting the document and the job name from the secure print service system to a rendering system to render the document into a format compatible with a network printer communicatively coupled to the secure print service system;

transmitting, by the secure print service, the job name to the network printer;

receiving the job name and the job password from the network printer in response to the transmitting of the job name to the network printer and the transmitting of the electronic message comprising the job name and the job password to the intended recipient;

comparing the job name and the job password received from the network printer with the job name and the job password generated by the secure print service system; and authorizing the rendering system to transmit the rendered document to the network printer for printing based on the comparing.

2. The method as claimed in claim 1, wherein the job name and the job password are associated with the print job to generate print data.

3. The method as claimed in claim 1, further comprising receiving from the user device an electronic address of the intended recipient of the printed document, wherein the intended recipient is different than a user of the user device sending the electronic address.

4. A secure print service system for securely printing a document, the secure print service system comprising:

a processor;

at least one module coupled to the processor to:

receive a print job from a user device, the print job comprising the document for printing;

generate a job name and a job password for the print job;

transmit an electronic message comprising the job name and the job password to an intended recipient, the electronic message excluding the document;

transmit the job name to a network printer communicatively coupled to the secure print service system, receive the job name and the job password from the network printer in response to the transmitting of the job name and the job password to the network printer and the transmitting of the job name and the job password to the intended recipient;

compare the job name and the job password received from the network printer with the job name and the job password generated by the secure print service system;

authenticate the job password received from the network printer based on the comparison;

in response to authenticating the job password, transmit the document and the job name to a rendering system to render the document into a format compatible with the network printer, and dispatch the document in the rendered format to the network printer for printing.

5. The secure print service system as claimed in claim 4, wherein the print job includes at least one of an address of the network printer, an electronic address of the intended recipient, and the electronic message for the intended recipient.

6. The secure print service system as claimed in claim 4, wherein the at least one module is further to:
receive from the user device an electronic address of the intended recipient of the printed document, wherein the intended recipient is different than a user of the user device sending the electronic address.

7. A non-transitory computer-readable medium having a set of computer readable instructions that, when executed, cause a processor to:
generate a job name and a job password for a print job received by a secure print service system, wherein the print job is to print a document;
receive from a user device an electronic address of an intended recipient of the document, wherein the intended recipient is different than a user of the user device sending the electronic address;
transmit an electronic message comprising the job name and the job password from the secure print service system to the intended recipient, the electronic message excluding the document;
transmit the document and the job name from the secure print service system to a rendering system to render the document into a format compatible with a network printer communicatively coupled to the secure print service system;
transmit, by the secure print service, the job name to the network printer;
receive the job name and the job password from the network printer in response to the transmitting of the job name to the network printer and the transmitting of the electronic message comprising the job name and the job password to the intended recipient;
compare the job name and the job password received from the network printer with the job name and the job password generated by the secure print service system;
authenticate the job password received from the network printer based on the comparison; and
authorize the printing of the document based on the authentication.

8. The non-transitory computer-readable medium as claimed in claim 7, wherein the set of computer readable instructions, when executed, cause the processor to transmit the electronic message from the secure print service system to an intended recipient through at least one of an email service and a short message service.

9. The non-transitory computer-readable medium as claimed in claim 7, wherein the set of computer readable instructions, when executed, cause the processor to transmit instructions to the network printer to again receive the job password upon failure to authenticate the job password based on the comparison.

10. The non-transitory computer-readable medium as claimed in claim 7, wherein the set of computer readable instructions, when executed, cause the processor to:
store the print data at the secure print service system.

* * * * *